(12) United States Patent
Salter et al.

(10) Patent No.: US 9,487,136 B2
(45) Date of Patent: Nov. 8, 2016

(54) SYSTEM AND METHOD TO LOCATE VEHICLE EQUIPMENT

(71) Applicant: Ford Global Technologies, LLC, Dearborn, MI (US)

(72) Inventors: Stuart C. Salter, White Lake, MI (US); James J. Surman, Clinton Township, MI (US); Anthony Dwayne Cooprider, Rochester Hills, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/948,860

(22) Filed: Nov. 23, 2015

(65) Prior Publication Data

US 2016/0075277 A1 Mar. 17, 2016

Related U.S. Application Data

(63) Continuation-in-part of application No. 14/086,442, filed on Nov. 21, 2013.

(51) Int. Cl.
*B60Q 1/00* (2006.01)
*B60Q 1/26* (2006.01)
*B60Q 3/06* (2006.01)
*B60Q 3/02* (2006.01)

(52) U.S. Cl.
CPC ............... *B60Q 3/06* (2013.01); *B60Q 3/0209* (2013.01); *B60Q 3/0279* (2013.01); *B60Q 3/0283* (2013.01); *B60Q 2500/10* (2013.01)

(58) Field of Classification Search
CPC .. B60Q 3/008; B60Q 3/0209; B60Q 3/0233; B60Q 3/0279; B60Q 3/0283; B60Q 3/06
USPC .................................. 362/488, 496, 509–510
See application file for complete search history.

(56) References Cited

U.S. PATENT DOCUMENTS

| | | |
|---|---|---|
| 5,709,453 A | 1/1998 | Krent et al. |
| 6,117,362 A | 9/2000 | Yen et al. |
| 6,290,278 B1 | 9/2001 | Loveland |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A vehicle system configured to identify a location of emergency equipment is disclosed. The vehicle system comprises a storage compartment forming an interior cavity disposed in a cargo area and a cover configured to facilitate access to the storage compartment. An illumination apparatus is disposed in the storage compartment and configured to illuminate a first portion of the storage compartment in response to a first vehicle condition. The illumination apparatus is further configured to illuminate a second portion of the storage compartment in response to a second vehicle condition.

19 Claims, 6 Drawing Sheets

(56) References Cited

U.S. PATENT DOCUMENTS

| | | |
|---|---|---|
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10147288 A1 | 7/2003 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

SYSTEM AND METHOD TO LOCATE VEHICLE EQUIPMENT

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related application is hereby incorporated by reference in its entirety.

FIELD OF THE INVENTION

The present invention generally relates to a lighting apparatus and more specifically relates to a lighting apparatus for a vehicle storage compartment.

BACKGROUND OF THE INVENTION

Modern vehicles utilize various systems to improve convenience and ease of use. Some vehicles may utilize various illumination devices to enable occupants to more easily store and/or organize belongings in various storage compartments.

SUMMARY OF THE INVENTION

According to one aspect of the present invention, a vehicle system configured to identify a location of emergency equipment is disclosed. The vehicle system comprises a storage compartment forming an interior cavity disposed in a cargo area and a cover configured to facilitate access to the storage compartment. An illumination apparatus is disposed in the storage compartment and configured to illuminate a first portion of the storage compartment in response to a first vehicle condition. The illumination apparatus is further configured to illuminate a second portion of the storage compartment in response to a second vehicle condition.

According to another aspect of the present invention, a method for identifying a location of emergency equipment in a vehicle is disclosed. The method comprises detecting a vehicle condition. In response to the vehicle condition being detected, the method continues to illuminate a first portion of the vehicle to identify an access panel. The method continues to illuminate a second portion selectively concealed by the access panel in response to opening the access panel. The second portion corresponds to and identifies a location of the emergency equipment.

According to yet another aspect of the present invention, a vehicle notification apparatus is disclosed. The apparatus comprises a first light source configured to output a first emission in a first direction and a second light source configured to output a second emission in the first direction. The apparatus further comprises a controller configured to selectively activate first light source and the second light source. The first light source is activated in response to a first vehicle condition, and the second light source is activated in response to a second vehicle condition. The apparatus further comprises a first optic device configured to redirect the first emission in a second direction.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure, which may be combined in various combinations and/or individually utilized in order to clearly reference various elements of the disclosure.

The following disclosure describes a notification system for a vehicle configured to guide an operator of the vehicle to a location of equipment corresponding to a condition or failure condition of the vehicle. For example, in response to a vehicle control module identifying that the vehicle is out of fuel, the notification system may be activated to identify a location of equipment that may be utilized to resolve the failure condition (e.g. add fuel to the vehicle). The notification system may utilize one or more lighting or illumination apparatuses to guide the operator to the equipment. Additionally, the system may provide one or more instructions to the operator via a display or indicator, which may correspond to a vehicle status indicator displayed on a gauge cluster or console.

Figure 1:
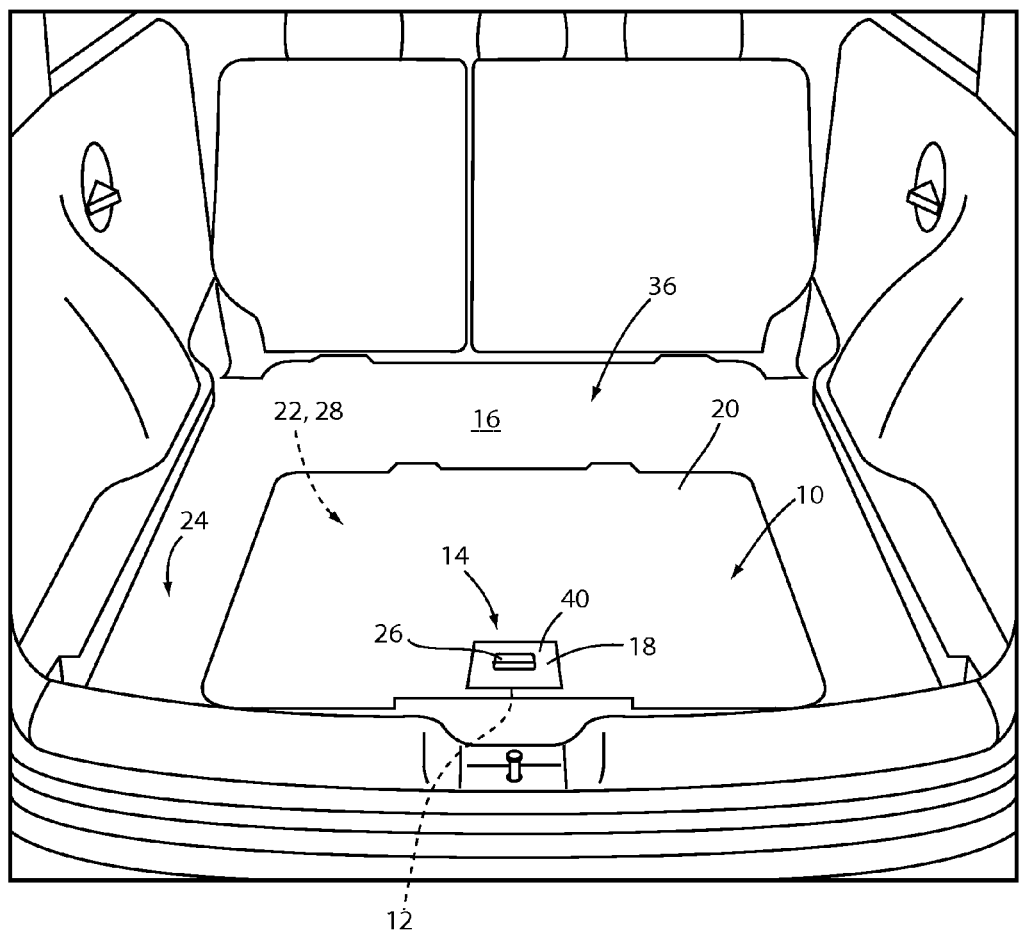
FIG. 1 is a projected view of a cargo area of a vehicle.

In response to the failure condition of the vehicle (in this example the fuel outage), the notification system may display a message on the status indicator instructing the operator to access the cargo area of the vehicle. Once the cargo area is accessed, the notification system 10 may illuminate at least one light source 12 of an illumination apparatus 14 disposed in the cargo area 16 as shown in FIG. 1. The illumination apparatus 14 may selectively illuminate the location of an access portion 18 of a cover 20 in response to the vehicle failure condition. The cover 20 may be configured to conceal a storage compartment 22 disposed in a floor portion 24 of the cargo area 16. In this way, the notification system 10 may be configured to guide the operator of the vehicle to the storage compartment 22 to access equipment to assist in resolving the vehicle failure condition.

As described herein, the disclosure provides for a notification system that may be configured to assist or direct an operator of a vehicle to a location or access area for equipment that may assist the operator in resolving a failure condition of the vehicle. Though discussed in reference to the particular conditions of a tire failure and a fuel outage herein, the notification system may be configured to assist the operator in resolving a variety of conditions, particularly those that may be sensed by one or more systems of the vehicle. As such, the notification system may be configured to direct the operator to a variety of equipment corresponding to particular faults or conditions identified by the controller of the vehicle.

In the particular example, discussed in reference to FIG. 1, the illumination apparatus may direct the operator to a handle portion 26 corresponding to the access portion 18 of the cover 20 of the storage compartment 22. Once the operator has accessed a cavity 28 formed by the storage compartment 22, the illumination apparatus 14 or additional apparatuses of the notification system 10 may continue to direct the operator to specific equipment that may be utilized to recover from the condition. In this example, the illumination apparatus 14 may direct the operator to a funnel such that the operator may add fuel to the vehicle to recover from the low fuel condition. As discussed herein, the notification system 10 may direct the operator to particular equipment based on a condition of the vehicle. Though referred to herein as the operator of the vehicle, the notification system may direct any person to equipment corresponding to a vehicle condition.

Figure 2:
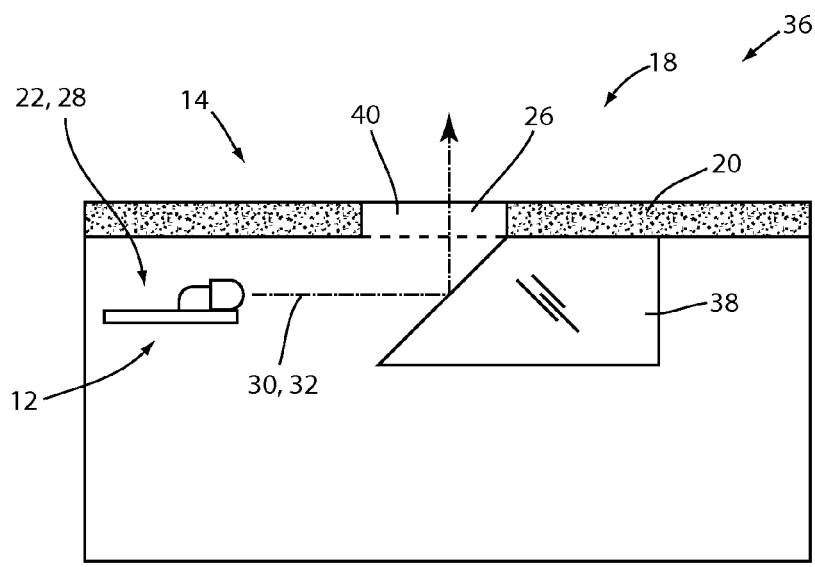
FIG. 2 is a detailed side view of a first optic device of a notification system in connection with a cover of a storage compartment.
Figure 3:
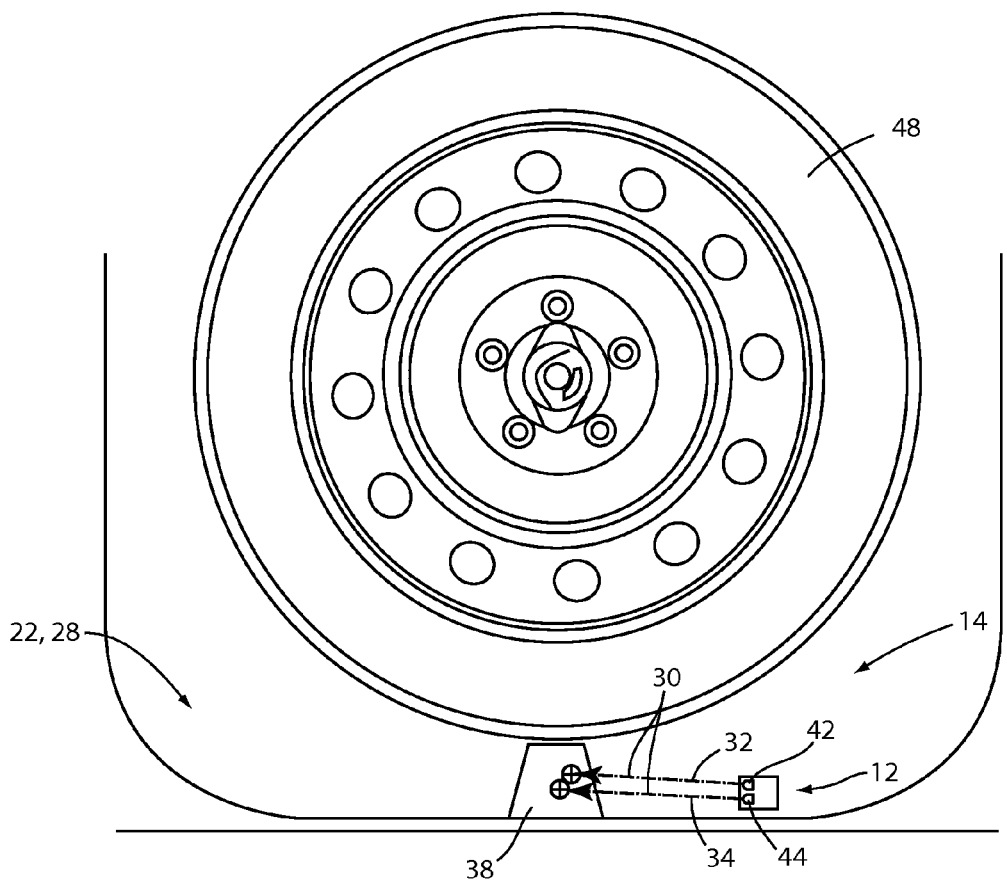
FIG. 3 is a partial top view of a storage compartment demonstrating an illumination apparatus of a notification system.

Referring now to FIGS. 2 and 3, a side profile view and a top view of the illumination apparatus 14 are shown, respectively.

Referring first to FIG. 2, the illumination apparatus 14 may be configured to output at least one emission of light 30. The at least one emission of light 30 may correspond to a first emission 32 and a second emission 34 as shown in FIG. 3. A controller of the notification system 10 may be configured to selectively activate the first emission 32 or the second emission 34 corresponding to the vehicle condition or warning condition detected by the controller of the vehicle. In this configuration, the notification system 10 may provide for the selective illumination of equipment corresponding to particular faults or conditions identified by the controller.

The illumination apparatus 14 may be configured to selectively illuminate the handle portion 26 when the cover 20 is oriented in a closed configuration 36 as illustrated in FIGS. 1 and 2. The cover 20 may comprise a first optic device 38 configured to reflect the at least one emission of light 30 such that the light emitted from the illumination apparatus 14 is reflected upward through an at least partially light transmissive portion 40 of the handle portion 26. As shown in FIG. 3, the first optic device 38 is shown with the cover 20 hidden but still oriented in the closed configuration 36. From this perspective, the first emission 32 and the second emission 34 are shown emitted into the light transmissive portion 40 of the handle portion 26 such that the handle portion 26 is illuminated. In this way, the illumination apparatus 14 may provide for the handle portion 26 to be illuminated such that the operator of the vehicle is guided to utilize the handle portion 26 to access the storage compartment 22.

In some embodiments, the illumination apparatus 14 may be configured to illuminate the handle portion 26 by selectively activating a first light source 42 to output the first emission 32 or a second light source 44 to output the second emission 34. In such embodiments, the handle portion 26 may be illuminated by the selective activation of either the first light source 42 or the second light source 44. As such, the operator of the vehicle may be guided to utilize the handle portion 26 to access the storage compartment 22 in response to the selective illumination of the first light source 42 or the second light source 44. In this way, the notification system 10 may direct the operator to the storage compartment 22 in response to a plurality of conditions that may utilize more than one device or associated equipment to recover from each of the plurality of conditions.

As discussed herein, the plurality of conditions may correspond to at least one of a tire failure, a fuel outage, a tire pressure warning, and an emergency call placed through one or more communication systems in communication with the vehicle controller. More particular examples of conditions, including emergency conditions, failures, and fault states are discussed herein. The notification system 10 may be utilized to direct the operator of the vehicle to a wide variety of locations of the vehicle. In this way, the notification system 10 provides for a flexible solution that may direct the operator of the vehicle to a location and may further provide instructions to assist the operator in repairing or assisting the vehicle in recovering from such conditions.

Figure 4:
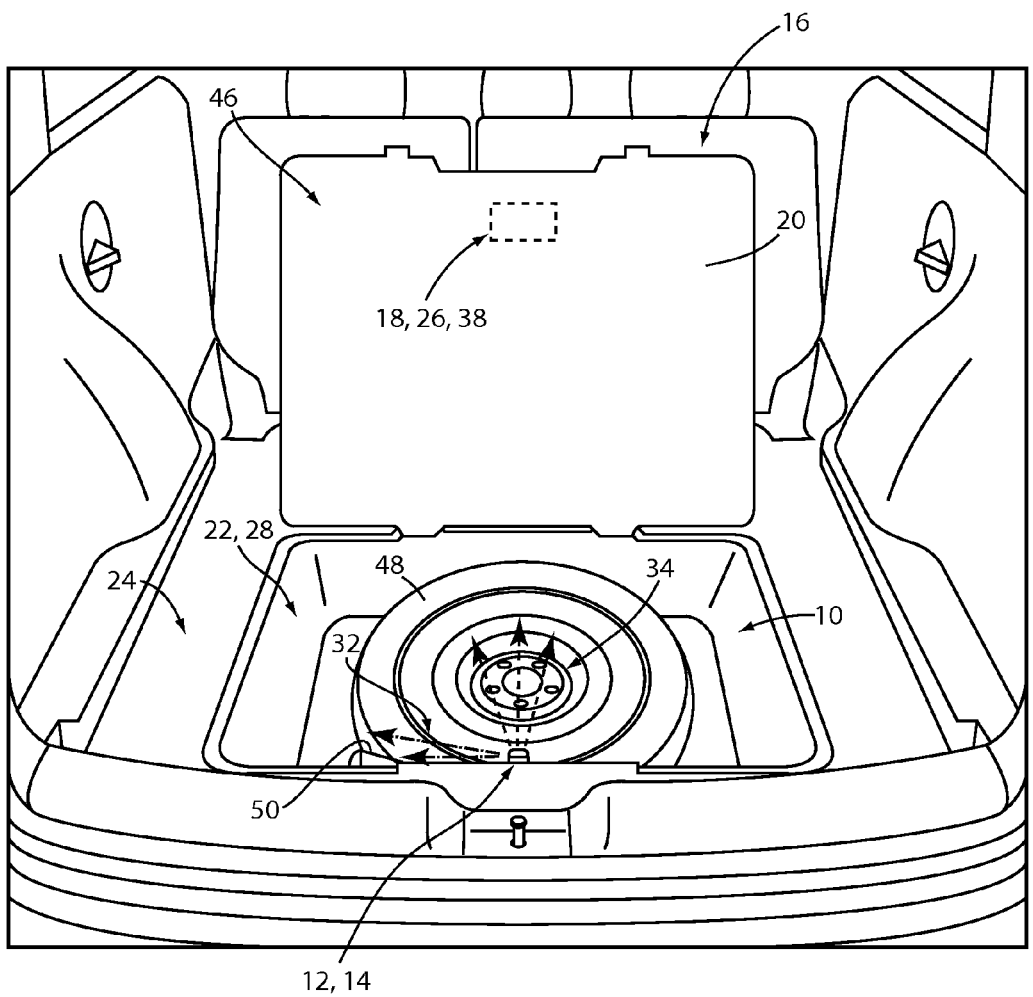
FIG. 4 is a projected view of a cargo area of a vehicle demonstrating a cover of a storage compartment in an open configuration.

Referring now to FIG. 4, the cargo area 16 of the vehicle is shown having the cover 20 oriented in an open configuration 46. With the cover 20 oriented in the open configuration 46, a spare tire 48 and funnel 50 are visible as being stowed in the cavity 28 of the storage compartment 22. Additionally, in the open configuration 46, the first optic device 38 may be repositioned with the handle portion 26 away from an emission path of the first emission 32 and/or the second emission 34. The first emission 32 and the second emission 34 are shown being output from the first light source 42 and the second light source 44 of the illumination apparatus 14. The first emission 32 and the second emission 34 are shown activated in FIG. 4 for clarity. However, the illumination apparatus 14 may be configured to selectively illuminate each of the first light source 42 and the second light source 44 to independently output the first emission 32 and the second emission 34. Additional details regarding the independent activation of the first emission 32 and the second emission 34 are further discussed in reference to FIGS. 5, 6, 7, and 8.

Figure 5:
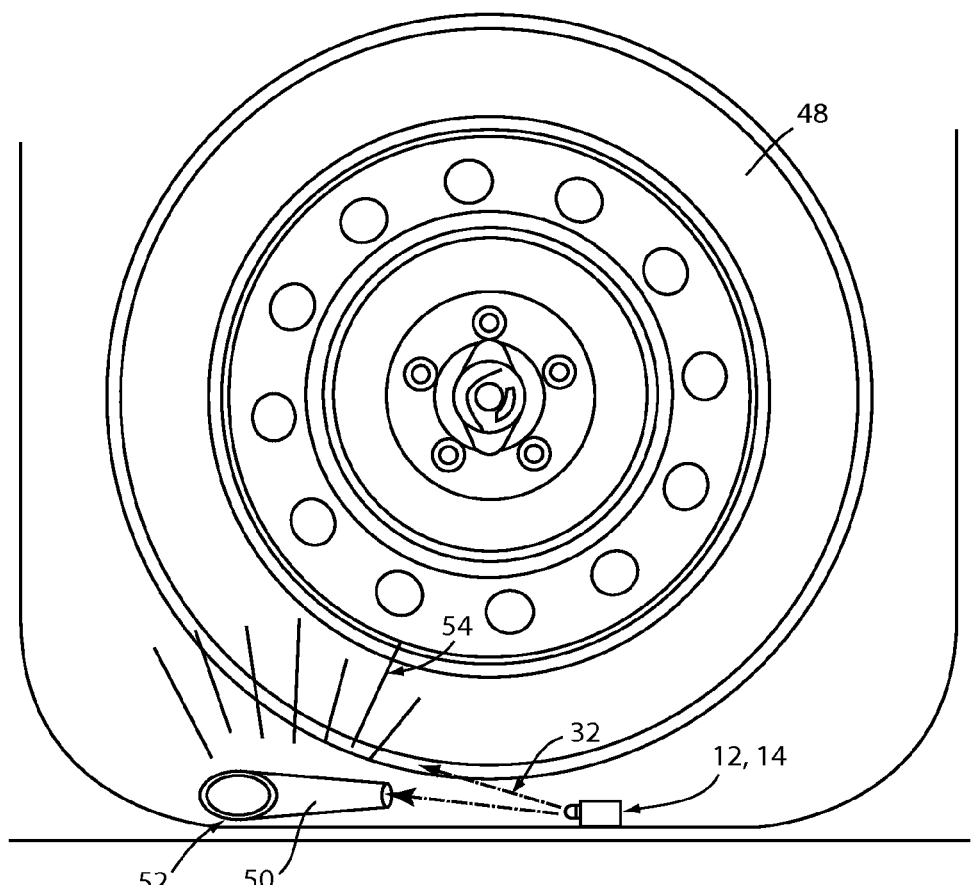
FIG. 5 is a partial top view of a storage compartment demonstrating an illumination apparatus demonstrating an illumination of a first light source of an illumination apparatus.
Figure 6:
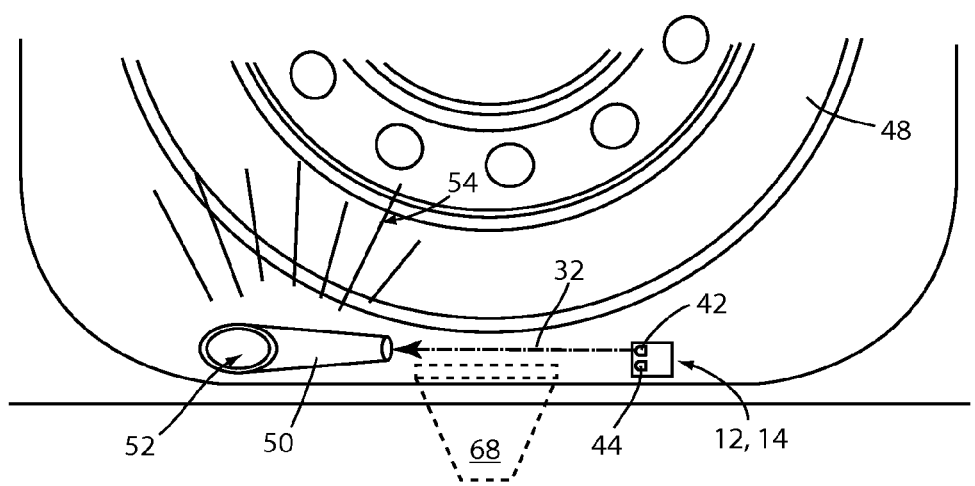
FIG. 6 is a detailed top view of an illumination apparatus demonstrating an illumination of the first light source of FIG. 6.

Referring now to FIGS. 5 and 6, the first emission 32 is shown output from the first light source 42. As shown in FIGS. 5 and 6, the first light source 42 may be configured to selectively illuminate the funnel 50 in response to a fuel outage condition of the vehicle. The first light source 42 may be configured to output the first emission 32 outward into the cavity 28 such that the first emission 32 impinges upon the funnel 50. In this configuration, the first emission 32 may direct the operator's attention to the funnel 50. In this way, the notification 10 may direct the operator to the funnel 50 such that the operator may refuel the vehicle and assist in the recovery of the fuel outage condition detected by the vehicle controller.

In some implementations, the equipment that the notification system 10 is configured to assist the operator in locating, may comprise one or more photoluminescent materials configured to illuminate the equipment. For example, the first emission 32 may correspond to an excitation emission configured to selectively illuminate a first photoluminescent portion 52 of the funnel 50. In this way, the funnel 50 may illuminate in a color of light different from the first emission 32. The different color of light emitted from the funnel 50 may be referred to herein as a first output emission 54.

The first photoluminescent portion 52 may be applied to the funnel 50 as a coating or layer and may be formed into a material thereof. In operation, the first emission 32 may be emitted from the first light source 42 toward the funnel 50. The first photoluminescent portion 52 may convert the first emission 32 or the first activation emission from a first color to one or more colors of ambient light different from the first color.

For example, the first emission 32 may be emitted from the first light source 42 at a first wavelength. The first wavelength may correspond to at least one absorption wavelength of one or more photoluminescent materials disposed in the first photoluminescent portion 52. The photoluminescent materials may convert the excitation emission at the first wavelength to the first output emission 54 having a second wavelength, different from the first wavelength. The first output emission 54 may comprise one or more wavelengths, one of which may be longer than the first wavelength. The conversion of the excitation emission to the first output emission 54 by the photoluminescent materials is referred to as a Stokes shift.

In some embodiments, the first output emission 54 may correspond to a plurality of wavelengths. Each of the plurality of wavelengths may correspond to significantly different spectral color ranges. For example, the at least second wavelength of the first output emission 54 may correspond to a plurality of wavelengths. In some implementations, the plurality of wavelengths may be combined in the first output emission 54 to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength of approximately 400-525 nm.

The photoluminescent materials corresponding to the photoluminescent portions discussed herein may comprise organic or inorganic fluorescent dyes configured to convert an excitation emission to an output emission. For example, a photoluminescent portion may comprise a photoluminescent structure of rylenes, xanthenes, porphyrins, phthalocyanines, or other materials suited to a particular Stokes shift defined by an absorption range and an emission fluorescence. In some embodiments, a photoluminescent portion may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received from the excitation emission configured to excite one or more photoluminescent materials to emit an output emission having a desired color.

As discussed herein, the output emission from the photoluminescent portions may be output from a portion of the vehicle or equipment associated therewith to provide for the ambient light to identify a location of the portion or equipment. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Figure 7:
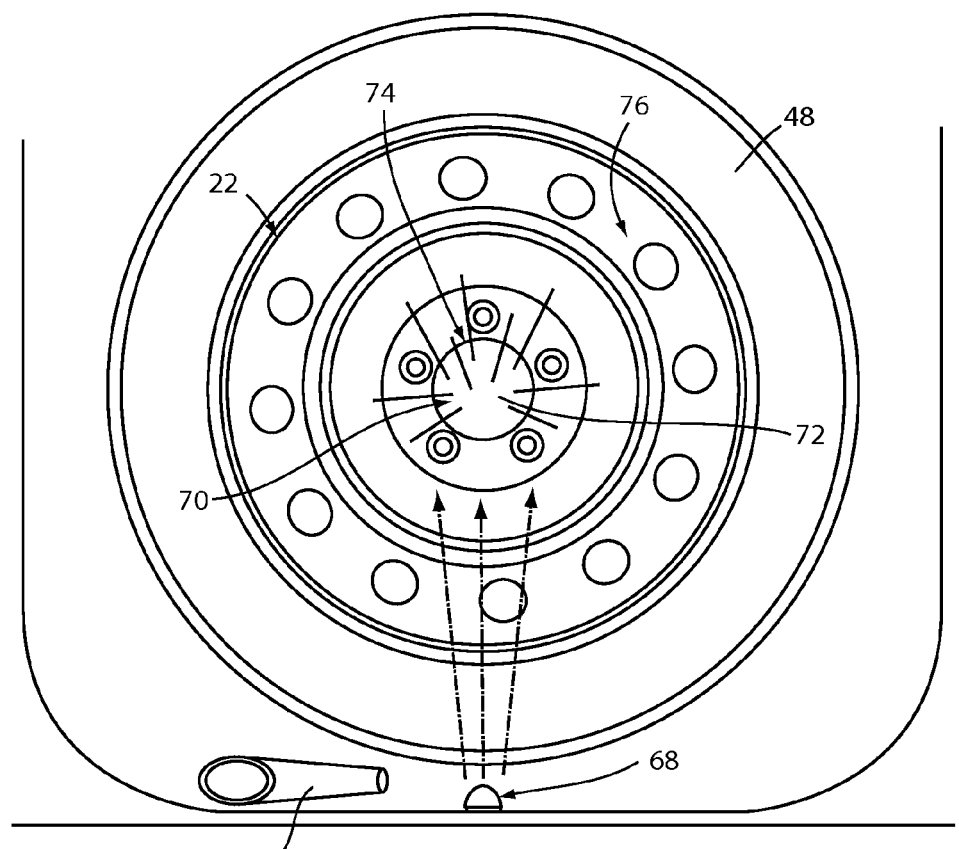
FIG. 7 is a partial top view of a storage compartment demonstrating an illumination apparatus demonstrating an illumination of a second light source of an illumination apparatus.
Figure 8:
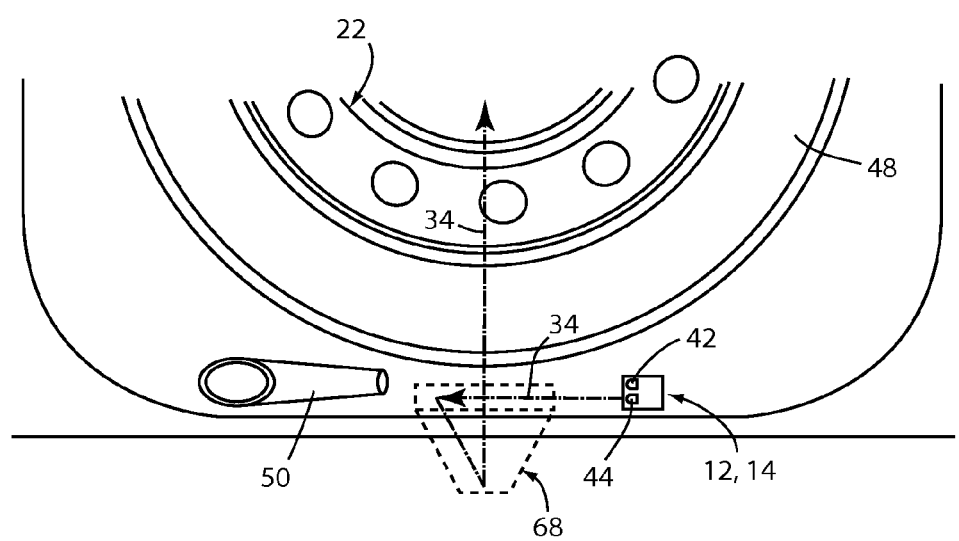
FIG. 8 is a detailed top view of an illumination apparatus demonstrating an illumination of a second light source of FIG. 7.

Referring now to FIGS. 7 and 8, a top view of the storage compartment 22 is shown demonstrating the second emission 34 output from the second light source 44 of the illumination apparatus 14. The illumination apparatus 14 may be configured to selectively illuminate the second light source 44 in response to the vehicle controller identifying a tire failure or other condition that may require a tire of the vehicle to be changed. In response to the detection of the tire failure, the notification system 10 may be configured to activate the second light source 44 such that the spare tire 48 in the storage compartment 22 is illuminated by the second emission 34. In this way, the notification system 10 may direct the operator to the spare tire 48 such that the operator may assist in the recovery of a tire failure condition.

As demonstrated in FIG. 8, the second light source 44 may output the second emission 34 in substantially the same direction as the first emission 32. However, the second emission 34 may be laterally offset from the first emission 32 such that the second emission substantially impinges upon a second optic device 68. The second optic device 68 may be configured to redirect the second emission 34 such that the second emission 34 is directed toward a central portion 70 of the spare tire 48. The central portion 70 may correspond to a location of a fastener 72 configured to retain a storage location of the spare tire 48 in the storage compartment 22. In this way, the notification system 10 may direct the attention of the operator to the fastener 72, such that the operator may easily identify the location of the fastener 72.

Similar to the funnel 50, the central portion 70 proximate the spare tire 48 may comprise a second photoluminescent portion 74. For example, the second emission 34 may correspond to an excitation emission configured to selectively illuminate the second photoluminescent portion 74 of the central portion 70. In this way, the central portion 70 may illuminate in a color of light different from the second emission 34. The different color of light emitted from the second photoluminescent portion 74 may be referred to herein as a second output emission 76.

The second photoluminescent portion 74 may be applied to the central portion 70 as a coating or layer and may be formed into a material thereof. In operation, the second emission 34 may be emitted from the second light source 44 toward the second optic device 68. The second optic device 68 may redirect the second emission 34 toward the second photoluminescent portion 74. The second photoluminescent portion 74 may convert the second emission 34 or the second activation emission from a second color to one or more colors of ambient light different from the second color.

The second emission 34 may be emitted from the second light source 44 at a second wavelength. The second wavelength may correspond to at least one absorption wavelength of one or more photoluminescent materials disposed in the second photoluminescent portion 74. The photoluminescent materials may convert the excitation emission at the first wavelength to the second output emission 76 having a second wavelength, different from the first wavelength. The second output emission 76 may comprise one or more wavelengths, one of which may be longer than the first wavelength.

Figure 9:
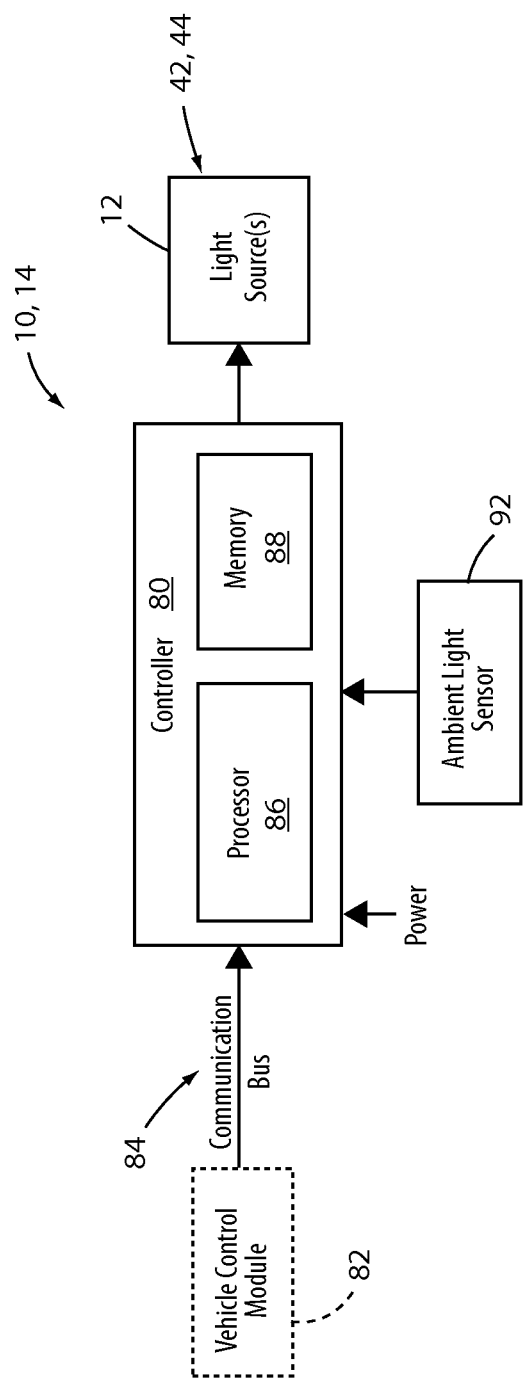
FIG. 9 is a block diagram of a notification system for a vehicle in accordance with the disclosure.

Referring to FIG. 9, a block diagram of a controller 80, which may be configured to control the first light source 42 and the second light source 44 is shown. The controller 80 may be in communication with a vehicle control module 82 via a communication bus 84 of the vehicle. The communication bus 84 may be configured to deliver signals to the controller 80 identifying various vehicle states. For example, the communication bus 84 may be configured to communicate to the controller 80 a variety of vehicle conditions, for example a fuel level, a tire failure, a tire pressure warning, an emergency call or any other information or control signals that may be communicated via the communication bus 84. In this way, the controller 80 may selectively activate the light sources in response to one or more conditions identified by the vehicle controller.

The controller 80 may include a processor 86 comprising one or more circuits configured to receive the signals from the communication bus 84 and output signals to control the light sources (e.g. 42 and 44) discussed herein. The processor 86 may be in communication with a memory 88 configured to store instructions to control the activation of the light sources. The controller 80 may further be in communication with an ambient light sensor 92. The ambient light sensor 92 may be operable to communicate a light condition, for example a level brightness or intensity of the ambient light proximate the vehicle. In response to the level of the ambient light, the controller 80 may be configured to adjust a light intensity output from the light sources 42 and/or 44. The intensity of the light output from the light sources 42 and 44 may be adjusted by controlling a duty cycle, current, or voltage supplied to the light sources 42 and 44.

The controller 80 may be configured to selectively activate and/or deactivate the light sources 42 and 44 in response to various vehicle conditions or failure conditions. For example, conditions or failure conditions may correspond to conditions that may be identified or sensed by a controller of the vehicle and may include low tire pressure, low fuel, a limited traction condition, wherein motion of the vehicle is inhibited, etc. In response to such conditions, the notification system 10 may direct the attention of the operator to at least one of a glove box, a console bin/center console, and/or a cargo compartment of the vehicle. In this way, the notification system 10 may direct the operator of the vehicle to a variety of vehicle equipment, which may include a spare tire, a funnel, a tire pressure gauge, a flash light, a shovel, a first aid kit, a fire extinguisher, etc. In this configuration, the controller 80 may selectively activate the light sources 42 and 44 to direct an operator of the vehicle to a location of the vehicle corresponding to the vehicle condition. The controller 80 may further be configured to deactivate the light sources 42 and 44 in response to a change in the conditions that led to the activation and/or in response to a lapse of a predetermined time.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle system configured to identify a location of emergency equipment comprising:
    a storage compartment forming an interior cavity disposed in a cargo area;
    a cover configured to facilitate access to the storage compartment; and
    an illumination apparatus configured to:
        illuminate a first portion of the storage compartment in response to a first vehicle condition; and
        illuminate a second portion of the storage compartment in response to a second vehicle condition.

2. The vehicle system according to claim 1, wherein the illumination apparatus is further configured to illuminate a portion of the cover in response to the first vehicle condition and the second vehicle condition.

3. The vehicle system according to claim 1, wherein the illumination apparatus comprises a plurality of light sources.

4. The vehicle system according to claim 3, wherein the plurality of light sources comprise a first light source configured to selectively illuminate the first portion and a second light source configured to selectively illuminate the second portion independently.

5. The vehicle system according to claim 1, wherein the first portion corresponds to a first device corresponds to a utility device configured to remedy the first vehicle condition.

6. The vehicle system according to claim 5, wherein the second portion corresponds to a second device corresponds to a utility device configured to remedy the second vehicle condition.

7. The vehicle system according to claim 6, wherein the illumination apparatus receives a notification signal identifying the first vehicle condition and the second vehicle condition from a vehicle control module in communication therewith.

8. The vehicle system according to claim 1, further comprising a photoluminescent portion disposed on at least one of the first portion and the second portion.

9. The vehicle system according to claim 8, wherein the photoluminescent portion is configured to illuminate in response to receiving an activation emission from the illumination apparatus.

10. A method for locating emergency equipment in a vehicle comprising:
   detecting a vehicle condition;
   illuminating a first portion of the vehicle to identify an access panel in response to the vehicle condition;
   illuminating a second portion selectively concealed by the access panel in response to opening the access panel, wherein the second portion identifies a location of the emergency equipment, wherein the access panel corresponds to an interior access panel configured to conceal a storage compartment disposed in a cargo area.

11. The method according to claim 10, further comprising:
   displaying a message providing a location of the access panel.

12. The method according to claim 10, wherein the illuminating the first portion is in response to opening an exterior door configured to provide access to the location.

13. The method according to claim 10, wherein the access panel corresponds to a cover comprising a handle configured to facilitate access to the storage compartment.

14. The method according to claim 10, wherein the emergency equipment corresponds to at least one of a spare tire, a funnel, a first aid kit, a fire extinguisher, a tire repair device, and a fuse panel.

15. A vehicle notification apparatus comprising:
   a first light source configured to output a first emission in a first direction;
   a second light source configured to output a second emission in the first direction;
   a controller configured to detect a plurality of vehicle failure conditions and selectively activate the first light source in response to a first failure condition and the second light source in response to a second failure condition; and
   a first optic device configured to illuminate an access panel disposed in a cargo area by redirecting the first emission in a second direction.

16. The vehicle notification apparatus according to claim 15, wherein the first light source and the second light source are disposed in a storage compartment comprising a cover.

17. The vehicle notification apparatus according to claim 16, further comprising a second optic device in connection with the cover and configured to reflect the first emission and the second emission to illuminate a handle of the cover in response to the cover arranged in a closed configuration.

18. The vehicle notification apparatus according to claim 15, wherein the first emission illuminates a first portion of the storage compartment in response to a first failure condition received from a vehicle control module.

19. The vehicle notification apparatus according to claim 18, wherein the second emission illuminates a second portion of the storage compartment in response to a second failure condition received from the vehicle control module.

* * * * *